United States Patent [19]

Zuleeg et al.

[11] Patent Number: 4,505,582

[45] Date of Patent: Mar. 19, 1985

[54] SELF-DETECTING OPTICAL SENSORS

[75] Inventors: Rainer Zuleeg, San Juan Capistrano; Johannes K. Notthoff, Lomita, both of Calif.

[73] Assignee: The United States of America as represented by the Secretary of the Air Force, Washington, D.C.

[21] Appl. No.: 398,134

[22] Filed: Jul. 14, 1982

[51] Int. Cl.³ .......................... G01C 3/08; H01S 3/00
[52] U.S. Cl. .......................................... 356/5; 372/25; 372/38
[58] Field of Search ........................ 372/25, 38; 356/5

[56] References Cited

U.S. PATENT DOCUMENTS

| | | | |
|---|---|---|---|
| 3,409,368 | 11/1968 | Fernandez | 356/5 |
| 3,508,828 | 4/1970 | Froome et al. | 356/5 |
| 3,937,575 | 2/1976 | Bateman | 356/5 |
| 4,077,718 | 3/1978 | Graham et al. | 356/4 |
| 4,153,366 | 5/1979 | Mamon et al. | 356/5 |
| 4,174,177 | 11/1979 | Gardner et al. | 356/5 |
| 4,190,361 | 2/1980 | Dubrunfaut | 356/5 |
| 4,298,280 | 11/1981 | Harney | 356/5 |
| 4,400,812 | 8/1983 | Clark et al. | 372/38 |
| 4,447,149 | 5/1984 | Marcus et al. | 356/5 |

Primary Examiner—S. C. Buczinski
Attorney, Agent, or Firm—Donald J. Singer; Stanton E. Collier

[57] ABSTRACT

A short-ranging laser system having an improved pulser which includes a drive pulse signal generator and a driver. The drive pulse signal generator is essentially a triggered bipolar avalanche transistor that outputs a drive pulse signal through a voltage shifting circuit to the driver. The driver is essentially two parallel-connected power MOSFETs that output a driver pulse to a GaAs heterojunction laser diode. By circuit design, the deadtime plateau is substantially reduced so that the laser return energy homodynes with the still active laser to produce a detectable output for a target within 5 meters.

4 Claims, 7 Drawing Figures

IDEAL RESPONSE ACROSS LASER DIODE IN SELF DETECTING MODE IN PHOTOMIXING REGION, DASHED SIGNAL INDICATES PHOTODETECTION WITH PHOTOVOLTAIC OPERATION

MEASURED RESPONSE OF LD-61 $P_{OPT}$ = 1.7 WATTS
SCALES: VERTICAL 0.5 V/DIV, HORIZONTAL 20n SEC/DIV

IDEAL RESPONSE ACROSS LASER DIODE IN SELF
DETECTING MODE IN PHOTOMIXING REGION, DASHED
SIGNAL INDICATES PHOTODETECTION WITH PHOTOVOLTAIC
OPERATION

4,505,582

SELF-DETECTING OPTICAL SENSORS

STATEMENT OF GOVERNMENT INTEREST

The invention described herein may be manufactured and used by or for the Government for governmental purposes without the payment of any royalty thereon.

BACKGROUND OF THE INVENTION

This invention is generally related to optical sensors, and, more particularly, to optical sensors used for short-ranging.

In general electro-optical ranging systems in the past have used radiant energy to determine the distance between two objects. A first object transmits the radiant energy and a second object such as a target reflects a portion of the transmitted energy back to the first object wherein a receiver responds to the returned portion of the transmitted energy. A timing means within the first object is able to note the elapsed time between transmission and reception so as to be able to arrive at the range between the objects. The first object having the transmitting and receiving means therein may include separate means such as a light emitting diode for transmitting the radiant energy and a photo-sensitive semiconductor for receiving the returned energy, or have the means combined wherein the transmitting and receiving means is a transducer such as a laser diode adapted to function as both means. There are clearly advantages and disadvantages to both ways. When separated means are employed, one for transmission and one for reception of the radiant energy, the accuracy attained is dependent on the optical train alignment. Further, the receiving means should only be responsive to the wavelength range transmitted by the transmitting means in order to prevent spoofing. To facilitate noise rejection, a filter may be placed in the returned energy path; but the use of such a filter is costly and further limits the acceptance angle of the receiving means. When the first object uses combination means as the transmitter and the receiver, this may be a light emitting diode, for example, The light emitting diode emits radiant energy within a given wavelength range when driven into a conductive condition and also exhibits a conductive condition in response to receipt of the returned energy. The diode is controlled by circuitry which serves to periodically drive the diode into conduction so as to emit energy. The control circuitry and the diode exhibit a dead time after the transmission pulse. This clearly limits the short-ranging capability because the return energy does not cause conduction in the receiving means of the diode and control circuitry during this dead time. This drawback has motivated a search for receiving means that is able to respond to return energy in the time period after the transmission pulse to the end of the dead time, in particular.

SUMMARY OF THE INVENTION

There currently exists, therefore, the need for a pulser circuit that allows a laser diode to operate in a self-detection mode for use in a short ranging system. The present invention is directed toward satisfying that need with a pulser that emits a high current pulse of up to 20 amperes with a duration of 5 to 10 nanoseconds to a laser diode. The pulser further removes the dead time plateau. The high current pulse causes the laser diode to output a pulse of coherent energy. The energy reflects off a nearby target, within 5 meters for example, and a portion returns to the same laser diode wherein the return signal is homodyned in a still optically active laser diode. The amplified return signal is thereby detected by means of a buffer and receiver turned on by a receiver switch activated by the pulser circuit. The receiver outputs a return timing signal to a timer. A comparison of a return timing signal to a output timing signal allows a determination of the distance to the target from the laser diode.

It is therefore an object of the present invention to provide for a short-ranging measuring system using a single laser diode as both the transmitting and receiving means so that targets within 5 meters are detected.

It is another object of this invention to provide for a pulser circuit in the short-ranging measuring system that removes the plateau dead time and thus leaves the laser diode sensitive for detecting return energy.

It is another object of this invention to provide a short-ranging measuring system that uses homodyning in the self-detecting mode to amplify the return energy.

These and many other objects and advantages of the present invention will be readily apparent to one skilled in the pertinent art from the following detailed description of a preferred embodiment of the invention and the claims when considered in conjunction with the drawings.

DETAILED DESCRIPTION OF A PREFERRED EMBODIMENT

A pulser network of this invention drives a laser diode with currents up to 20 amperes with a duration of 5 to 10 nanoseconds. This network maintains a high impedance state in the laser diode and by doing so, the dead time plateau is removed, and thus, sensitivity to targets at about 5 meters with an echo time of 30 nanoseconds is attained. By eliminating or reducing the dead time plateau, the laser diode can be operated in the self-detection mode.

Figure 1:
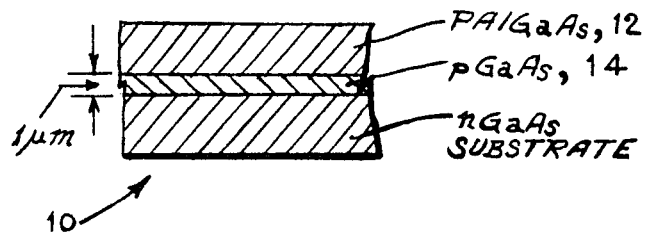
FIG. 1 is a layered cross-section of a laser diode heterojunction structure.

For the self-detection laser mode, it is advantageous to operate the pn-junction laser at room temperatures which requires a very efficient structure with a good heat sink. The most effective approach to lowering the threshold current for laser operation is a heterojunction structure 10 such as that illustrated in FIG. 1. The object of structure 10 is to confine the injected carriers to a narrow region so that population inversion can build up at lower current levels. In GaAs the laser action occurs primarily on the p side of the junction due to the higher efficiency of electron injection compared to hole injection. Because of the narrow p material, about 1 $\mu$m, and its termination in a barrier, the injected electrons will be confined near the junction. In FIG. 1, a layer 12 of p-type AlGaAs with a bandgap of 2 eV is grown by liquid phase epitaxy on top of a layer 14 of p-type GaAs. The wider bandgap of AlGaAs effectively terminates p-type GaAs layer 14 since injected electrons do not surmount the barrier at the GaAs-AlGaAs heterojunction. As a result of the confinement of injected electrons, laser action begins at a substantially lower current than for a simple pn-junction. In addition to the effect of carrier confinement, the change of refractive index at the heterojunction provides a waveguide effect for optical confinement of the photons.

Figure 2:
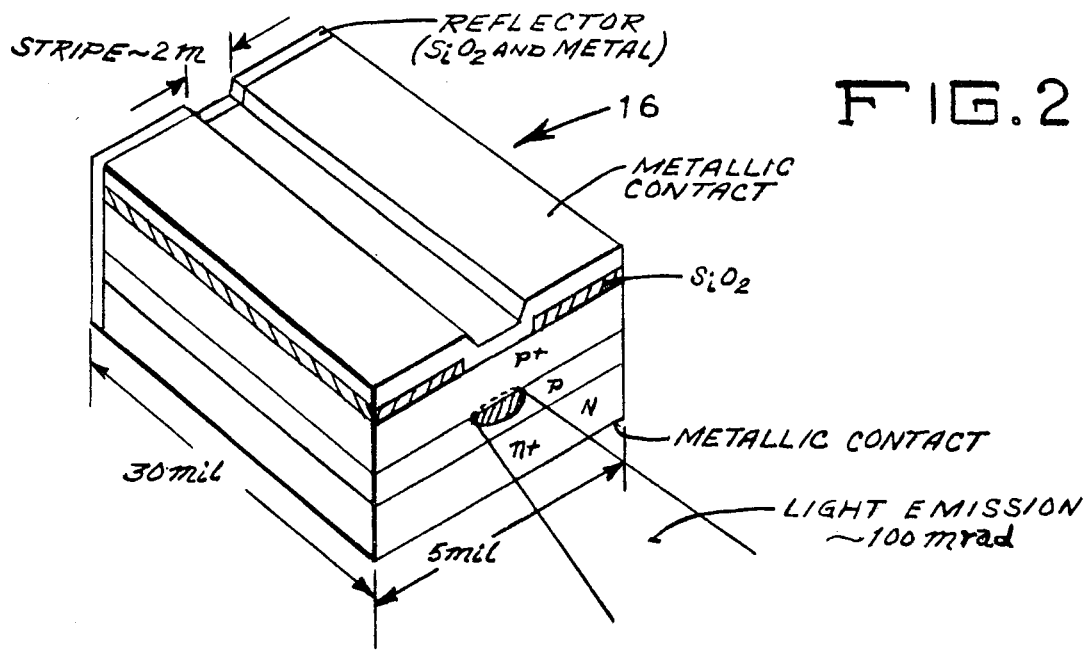
FIG. 2 is a pictorial representation of a laser diode.

At a sufficient forward bias stimulated emission occurs in a Fabry-Perot structure 16 shown in FIG. 2. Heterojunction structure 10 is incorporated into an operable device as hereinafter shown as in FIG. 2. It is said that when the photon emission rate exceeds the absorption rate, a population inversion occurs in the pn-junction and laser light emission commences. A typical laser diode is constructed of degenerate material on the p as well as on the n side. This requires a doping range of $5 \times 10^{17}$ to $5 \times 10^{18}$ cm$^{-3}$ for the donors (n-side) and $5 \times 10^{18}$ to $5 \times 10^{19}$ cm$^{-3}$ for the acceptors (p-side). A typical DH laser is shown in FIG. 2, which uses a stripe geometry and a Fabry-Perot resonance cavity, so that the light emission takes place on one side. This configuration (RCA Type SG2007) delivers a peak pulse power of 10 watts with a pulse length of 200 nanoseconds or an energy of $10^{-8}$ joules for a 2-nanosecond pulse. The length of the chip is usually about 30 mils and the stripe width is 2 mils so that a current density of $3.0 \times 10^{-3}$ A/cm$^2$ is present during operation. Leakage currents of GaAs laser diodes, when operated in the forward bias mode, are of no concern to laser efficiency. In the self-detection mode, leakage current plays an important role and is related to the total pn-junction area rather than just the strip area, as illustrated in FIG. 2. The leakage or reverse current in a pn-junction is given by the sum of the diffusion current in the neutral region, the generation current in the depletion region and the current on the surface by equation (1)

$$J_o = \frac{q n_i^2}{N_D} \sqrt{\frac{D_P}{\tau}} + \frac{q n_i W}{2\tau_o} + J_s (A/cm^2) \quad (1)$$

where $n_i$ is the intrinsic carrier concentration, $N_D$ the doping concentration of the n-side, $D_P$ the diffusion constant of holes, $\tau$ the lifetime of holes in the n-region, $W$ the depletion region width of the diode, and $\tau_o$ the recombination lifetime. For large $n_i$ values, such as Ge and Si, the first term will predominate, but for GaAs with a small value of $n_i$, because of the larger bandgap, the second term is the main contribution unless the surface leakage current becomes the only dominant component. With $J_s = 0$ the value of $I_o = 8.3 \times 10^{-12}$ A, when $n_i$ (300° K.) $= 1.1 \times 10^7$ cm$^{-3}$, $W = 10^{-5}$ cm, $A = 9.4 \times 10^{-4}$ cm and $\tau_o = 10^{-9}$ sec is inserted into Equation (1). This current will certainly be overshadowed by the surface leakage current component $I_S$ at room temperature in most practical areas.

If the GaAs pn-junction laser diode 10 is irradiated by photons of energy hf larger than the bandgap, hole-electron pairs will be generated. This results in a photocurrent $I_P$ flowing from n to p. After emitting a short light pulse, the GaAs laser diode will respond to the returned light signal of quantum energy equal to the bandgap of GaAs.

The diode can be operated in two detection modes. With a back bias on the junction, the photocurrent is fully collected and operation is in the so-called photodiode mode. With no bias on the diode and open circuit, the diode biases itself in the forward direction, so that the net current is zero and an open-circuit voltage is developed. In this case the operation is said to be in the photovoltaic mode. For the illuminated diode the voltage-current characteristic is given by equation (2), $$I = I_P - I_o [\exp (qV/kT) - 1] \quad (2)$$

where $I_P$ is the photogenerated current, $I_o$ is the leakage current and V the voltage across the diode. (The direction of positive current flow is from n to p and V is the voltage applied to the p region of the junction.) In the photovoltaic mode, the circuit current $I = 0$ and the open-circuit voltage is $$V = V_{oc} = \left(\frac{kT}{q}\right) \ln\left(1 + \frac{I_P}{I_o}\right) \quad (3)$$

For good response, the dark current or leakage current should be kept as small as possible and photocurrents $I_P$ should be much larger than $I_o$ to obtain detectable signals. The photocurrent, $I_P$ should be much larger than $I_o$ to obtain detectable signals. The photocurrent, $I_P$, can be calculated. Let E be the incident or reflected power and let R be the power reflection coefficient of the surface, then $E(1-R)$ is the energy entering into the diode, and the number of hole-electron pairs generated per second is $E(1-R)$hf. With n being the probability that the hole-electron pair is collected, the photocurrent then is equal to:

$$I_P = qE(1-R)n/hf \quad (4)$$

For a SG2007 laser diode one can generate an optical peak power output of 10 watts for a 200-nanosecond pulse duration. This translates into an energy of $10^{-8}$ joules for a 2-nanosecond duration. The calculated echo power at the detector is obtained from $$P_D = \frac{J \times \epsilon_T \times \cos\theta \times A_c \times e^{-tr}}{\pi \tau_p R^2} \quad (W) \text{ (Lambertian Target)} \quad (5)$$

where
  J = energy of light signal
  $\tau_p = 1$ nsec (duration of light pulse, i.e., half amplitude width)
  $\epsilon_T = 5 \times 10^{-2}$ (reflectivity)
  $A_c = 1$ cm$^2$ (collecting area)
  R = 500 cm (distance target-detector)
  $\cos \theta = 1$ (angle of incidence)
  $e^{-tr} = 0.99$ (clear air attenuation)
With $J = 10^{-8}$ joules the echo power amounts to $$P_{ECHO} = 0.63 \times 10^{-6} \text{ watts.}$$

Inserting this value into Equation (4) for E yields with $n = 0.5$ and $R = 0.5$ a value of $I_P = 135$ nA. With the calculated leakage current $I_o = 8.3 \times 10^{-12}$ A the theoretical open-circuit voltage of the detector should be according to Equation (3) equal to $$V_{oc} = 2.5 \times 10^{-3} \ln\left(1 + \frac{I_P}{I_o}\right) = 300 \text{ mV}$$

As long as $I_o$ is determined from bulk material properties, contained in Equation (1) and $I_S$ (or $J_s$) is assumed to be equal to zero, a good detection capability for GaAs laser diodes can be predicted. In most cases, the room temperature leakage current component will outweigh the bulk leakage currents and values of 0.1 to 1.0 A are not unusual. Therefore with $I_o = 1$ A the open-circuit voltage would be only $$V_{oc} = 25 \times 10^{-3} \ln(1 + 0.135) = 3.25 \, mV$$

This reveals a reduction in response by two orders of magnitude. It is therefore demonstrated that the leakage current component is the most important parameter in determining the self-detection sensitivity of GaAs laser diodes. Changing doping levels and geometry of the laser diode could be used to improve and optimize the detection capability by reducing or eliminating the surface leakage. In general, the detection sensitivity can be defined by $$d\,V_{oc}/d\,I_o = DT/qI_o = -R_o \qquad (6)$$

which decrease with increasing leakage current. The resistance value of $R_o$ is the differential resistance of the laser diode at zero applied bias. At low light intensities the open-circuit voltage can be approximated by $$V_{oc} = R_o I_p \qquad (7)$$

For the calculated $I_o = 8.3 \times 10^{-2}$ A value, $R_o$ is equal to $3 \times 10^9$ ohms, but decreases to $25 \times 10^3$ ohms with $I_o = 1 \times 10^{-6}$ A.

The conclusions of this theoretical analysis were substantiated with a variety of commercial laser diodes. Standard GaAs laser diodes were purchased and are listed in Table 1.

TABLE 1

| LIST OF PURCHASED GaAs LASER DIODES | | |
|---|---|---|
| QUANTITY | TYPE | MANUFACTURER |
| 3 | HR 982 | Plessey |
| 5 | LD-61 | Laser Diode Laboratories |
| 5 | LD-63 | Laser Diode Laboratories |
| 5 | LD-66 | Laser Diode Laboratories |
| 3 | C 30119 | RCA |
| 3 | C 30130 | RCA |
| 3 | C 30133 | RCA |
| 6 | SPX 4611 | Spectronics, Inc. |

GaAs laser diodes, when driven by a current pulse, show a time delay between electrical and optical signal. This effect becomes important when optimizing optical rangefinders for short distances. It will become a limiting factor of the self-detection mode of operation when short return signal time periods are required. The most limiting factor of the self-detecting optical sensors is the interference from the transient response of the electronic circuit after the termination of the current pulse. The amplitude of these interference signals determine the sensitivity of the self-detecting mode of operation of laser diodes. Two basic modes of photodetection are possible when a pulsed laser diode is operated in the self-detection mode and they are: (1) the normal photovoltaic detection mechanism of a pn-junction in the quiescent state, i.e., no excess minority carriers present at a time long after light emission cessation; and (2) the photomixing or homodyning mode of photodetection whereby the Fabry-Perot cavity is still excited in its resonant condition by the decaying minority carrier density present during light emission.

In direct photodetection all optical frequency and phase information is lost. The photovoltaic detection mode used in the self-detection mode has only the advantages of using (1) the same optical axis, (2) one semiconductor element and (3) built-in filtering and secure (narrowband) operation. The detector cannot respond to frequency or phase modulation of the optical carrier. It will reproduce amplitude variations of the incident power, as long as the rate of variation is less than the frequency response of the detector.

Photomixing or homodyning operation offers several advantages. It has been observed that, when a semiconductor laser is irradiated by its own output laser beam, the laser oscillator is appreciably enhanced. This results in a gain mechanism in the self-detection mode of operation and yields an improved signal to noise ratio. The observation and identification of this gain advantage of the self-detecting GaAs laser operation is obscured by the large interference signals from past electronic pulsers which prevent absolute measurements of the return energy signal amplitude in the time period immediately following the short light pulse. Amplitudes of 300 mV are recorded for the return energy signals which give, according to Equation 5, a calculated echo power of $0.64 \times 10^{-6}$ Watts with $P_o = 2$ Watts and $\tau_p = 10$ nanoseconds, so that the energy $J = P_o \tau_p = 2 \times 10^{-8}$ Joules. This value is in remarkable agreement with the example calculation predicting open circuit voltages $V_{oc} = 300$ mV, when $I_o$ assumes small values.

Figure 3:
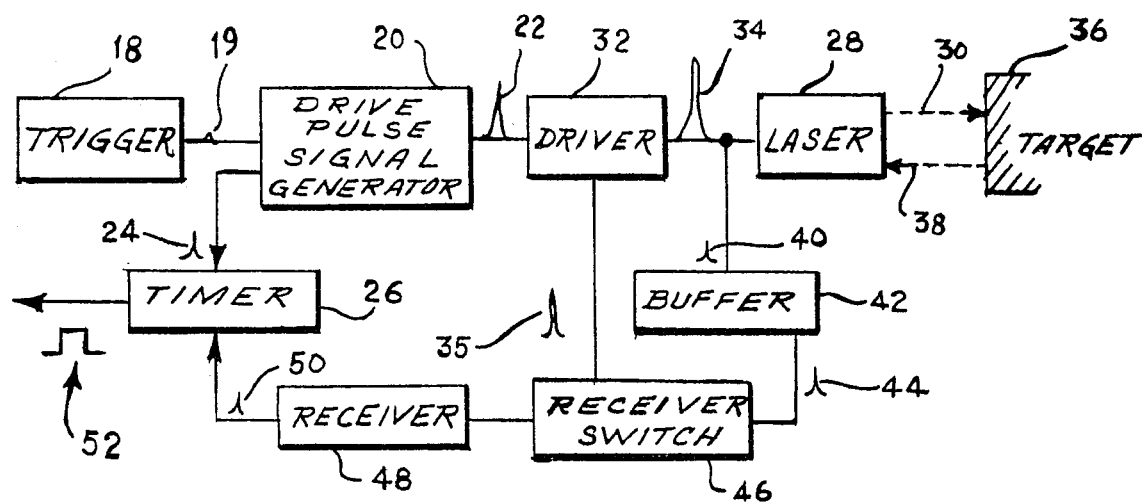
FIG. 3 is a functional electronic block diagram of the present invention.

In order to better understand the invention reference is made to FIG. 3 where an electronic block diagram illustrates cooperative circuits. An external trigger 18 initiates a drive signal generator 20 that controls the width and amplitude of a drive pulse signal 22. An initial timing signal 24 can also be output from drive signal generator 20 to a timer 26. Initial timing signal 24 causes timer 26 to start counting to indicate firing of a laser 28. The difference in time between drive pulse signal 22 and output of radiant energy 30 is insignificant when compared to the round trip time. Drive pulse signal 22 is input into a driver 32 that further increases the amplitude of drive pulse signal 22 and performs other functions to be noted hereinafter. A driver pulse 34 is output from driver 32 and is input into laser 28. Laser 28 is a conventional laser diode noted hereinabove or other suitable laser devices. Driver pulse 34 causes laser 28 to output radiant energy 30 by lasing action within the laser diode. Radiant energy 30 is reflected off a target 36 and a portion returns to laser 28 as a return energy 38. Return energy 38 homodynes with still active laser 28 to produce an output pulse 40 to a buffer 42 which in turn outputs a buffered pulse 44 to a receive switch 46. Switch 46 is turned off during pumping of laser 28 by a driver signal 35. Buffered pulse 44 passes through receiver switch 46 to a receiver 48 wherein buffered pulse 44 is acted upon to cause a return timing signal 50 to stop timer 26. The difference in time between initial timing signal 24 and return timing signal 50 is output by timer 26 as target range signal 52.

Figure 4A:
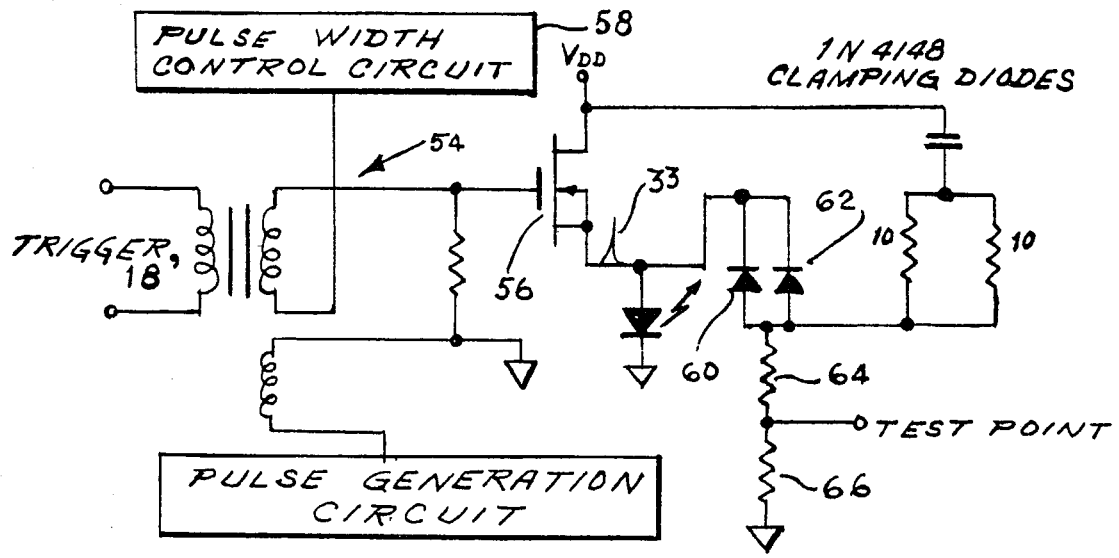
FIG. 4A is one prior art pulser network.

A commercial drive pulse generator and driver network is shown in FIG. 4A. An external trigger 18 initiates a three-winding pulse transformer/amplifier circuit 54 to provide a drive signal for an output driver 56, a type VMP4 V-MOS power FET. A pulse width stretching circuit 58 provides for a pulse width variation from about 12 to 15 nanoseconds. The output of the power FET is clamped by diodes 60 and 62 and resistors 64 and 66 which are also used for monitoring the pulse current. The network provides adequate current for laser diodes LD61, LD63, and LD66 but self-detection of return pulses is not detectable. It was determined that clamping diodes 60 and 62 were conducting during the time interval following the trailing edge of a driver pulse 33. By removing clamping diodes 60 and 62, the negative undershoot is increased; however, detection of the return energy 38 is possible. Also, large transients accompanying the recovery from the undershoot makes the extraction of a small return difficult.

Figure 4B:
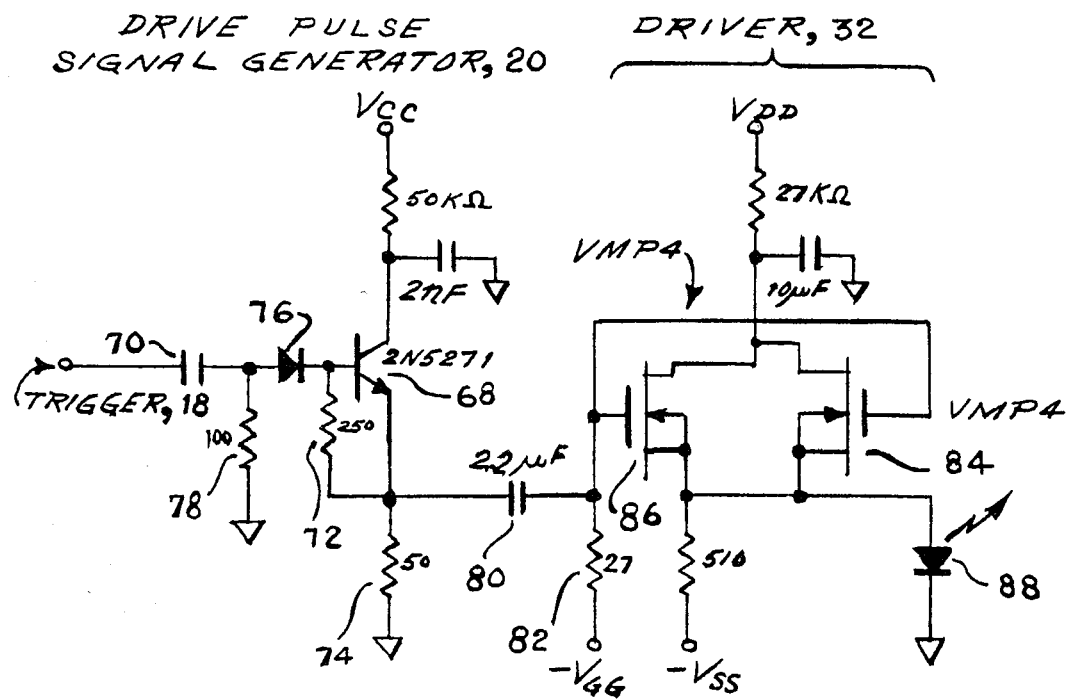
FIG. 4B is a schematic of the pulser circuit of this invention.

Reference is made to FIG. 4B where an improved drive pulse generator 20 and driver 32 is illustrated.

To generate a sufficiently large drive pulse signal 22, an avalanche bipolar transistor 68 in emitter-follower configuration fires at Vcc equal to 120 volts minimum to 200 volts maximum. A trigger pulse 19 is applied to a coupling capacitor 70. This high voltage is applied across resistors 72 and 74 acting as a voltage divider. The voltage across resistor 72 turns on avalanche transistor 68 so that current flows from Vcc through resistor 74. A blocking diode 76 insures that current does not flow through a load resistor 78 when transistor 68 is conducting. The voltage developed across resistor 74 is coupled by capacitor 80 to driver 32 and is level shifted by resistors 74 and 82 to drive the gates of parallel-connected power MOSFETs 84 and 86. By setting $-V_{gg}$ to approximately $-10$ volts, MOSFETs 84 and 86 are turned off before drive pulse signal 22 has decayed, provided that the undershoot at the source terminals is less than Vgg. By returning laser diode 88 anode to $-V_{ss}$ (approximately $-5$ volts), diode 88 is operative in the photoconductive mode. Also, this bias tends to limit the positive overshoot following the negative overshoot. The positive overshoot is clamped by laser diode 88.

The above network is designed to (1) eliminate storage time effects in driver 32 by using power MOSFETs, (2) minimizing series inductance in the laser diode 88 anode lead, and (3) shaping driver pulse 34 to minimize undershoot.

An analysis of the series driver pulse 34 inductance problem revealed that it is nearly impossible to eliminate the ensuing ringing following a 15- to 20-ampere, 18-nanosecond wide pulse into laser diode 88. The inductance of the lead between post and anode of diode 88 is calculated by using the relationship of equation (8).

$$L = \mu X_L / 2\pi [\ln 2X_L/r_c - 1] \quad (8)$$

where $\mu = \mu_o = 4\pi \times 10^{-7}$ H/m for air,
$X_L$ = conductor length, m
$r_c$ = conductor radius, m The 2.6-millimeter-long bonding lead results in L=2.24 nH. The post and external lead inductance, and the series inductances in the source and drain leads of the driver FET add up to a total inductance of approximately 10 nH. Without this inductance, a smooth pulse decay without undershoot could be expected. A computer simulation of the simplified pulse-diode circuit showed an undershoot of 5 volts following a 20-ampere triangular pulse. Measurements of the pulses performance showed undershoots in the 5-volt range followed by an overshoot clamped by the laser diode. The observation of return signals within 15 to 30 nanoseconds of the trailing edge of the electrical drive pulse to the laser diode is extremely difficult because of ringing which tends to bias the driver into an on-condition during undershoot, or causes clamping during overshoot. The ringing is caused by inductances in series with the emitting diode. A hybrid structure where the driver chip is connected the laser diode by low-inductance metallization can minimize series inductances.

Figure 5:
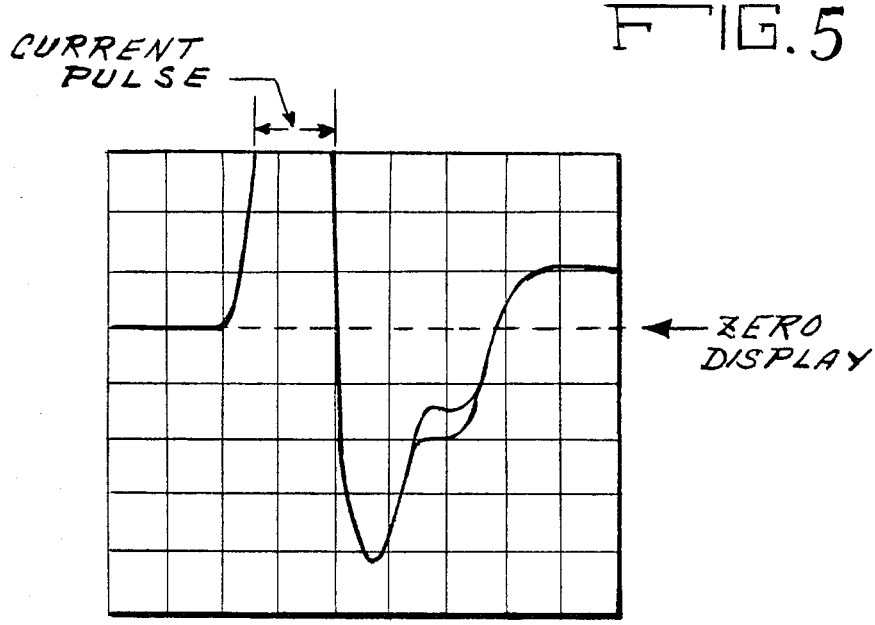
FIG. 5 is a graph of an experimental response of a laser diode.
Figure 6:
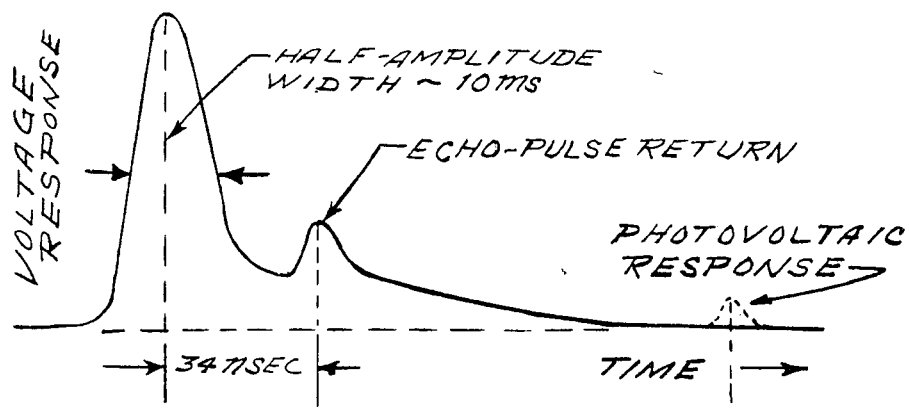
FIG. 6 is a graph of an ideal response of a self-detecting laser diode.

Using the LD-61 laser diode with optical output of 1.7 watts gave a detected return signal with an amplitude of about 0.3 to 0.5 volts which follows the laser diode response in unison with the high frequency ringing. A cleaned up trace is shown in FIG. 5. The first rising portion from the zero-display reference is the current pulse of 15 nanoseconds half-amplitude width. From the falling edge, a transition to the undershoot period is present. During the recovery from this undershoot, a ringing frequency of about 8 MHz is operative. The detected return signal is superimposed on the original trace, which is the lower one of the two. An ideal signal response is shown in FIG. 6. During the decaying light intensity period the return signal would be received and produce photomixing.

Clearly, many modifications and variations of the present invention are possible in light of the above teachings and it is therefore understood that, within the scope of the inventive concept, the invention may be practiced otherwise than specifically described.

What is claimed is:

1. A short distance laser ranging system comprising:
   means for lasing, said means for lasing outputting radiant energy in response to a driver pulse and homodyning with return energy reflected off a target, said lasing means receiving said return energy and amplifying said return energy, said return energy being received by said lasing means during a dead-time plateau period, said lasing means outputting a return energy signal,
   means for driving said lasing means, said means for driving substantially eliminating a dead-time plateau of said lasing means whereby said return energy is homodyned, said means for driving including means for generating a drive pulse signal in response to a trigger pulse and means for generating said driver pulse in response to said drive pulse signal from said means for generating a drive pulse signal, said driver pulse driving said lasing means to emit radiant energy, and
   means for outputting a time signal, said means for outputting reflecting the time duration between outputting said radiant energy and the reception of said return energy, said time signal being representative of the range between said target and said lasing means.

2. A short distance laser ranging system as defined in claim 1 wherein said means for driving said lasing means comprises said means for generating a drive pulse signal having an avalanche bipolar transistor having a base, a collector and an emitter, said transistor connected in an emitter-follower configuration, a bias resistor connected between said base and said emitter, and a current blocking diode connected to said base; means for inputting said trigger pulse including a coupling capacitor connected to receive said trigger pulse and connected to output a pulse to said blocking diode, and a load resistor connected to said coupling capacitor on the blocking diode side and to a ground; means for inputting a first positive voltage including a collector load resistor connected to a first positive voltage source and to said collector, and a ground capacitor connected to said collector and to ground; and means for output voltage shifting of said drive pulse signal including an emitter resistor connected to ground and a coupling capacitor connected to said emitter and to said means for generating a driver pulse; and said means for generating a driver pulse having means for providing a driver pulse including a pair of parallel-connected power MOSFETs, said MOSFETs having common gates, common collectors, and common emitters, and an emitter bias resistor connected between said common emitters and a second negative voltage source; means for providing gate bias including a bias resistor connected to said common gates and to a first negative voltage source, said coupling capacitor of said means for output voltage shifting connected to said common gates; and means for inputting a second positive voltage including a collector load resistor connected between a second positive voltage source and said common collectors, and a grounding capacitor connected to said common collectors and ground.

3. A short distance laser ranging system as defined in claim 2 wherein said lasing means includes a laser diode.

4. A short distance laser ranging system as defined in claim 3 wherein said first negative voltage source is about $-10$ volts, the first negative voltage of said first negative voltage source selected such that said MOSFETs are turned off before said drive pulse signal has decayed and the undershoot is less negative than said first negative voltage source, and wherein a laser diode anode is returned to the second negative voltage of said second negative voltage source, said second negative voltage being about $-5$ volts, said laser diode remaining in a photoconductive mode to be capable of homodyning with said return energy.

* * * * *